United States Patent
Al-Dhahir et al.

[11] Patent Number: 5,828,335
[45] Date of Patent: Oct. 27, 1998

[54] SPACECRAFT COMMUNICATION CHANNEL POWER CONTROL SYSTEM

[75] Inventors: Naofal Mohammed Wassel Al-Dhahir, Niskayuna; John Erik Hershey, Ballston Lake; Gary Jude Saulnier, Rexford, all of N.Y.

[73] Assignee: Martin Marietta Corporation, King of Prussia, Pa.

[21] Appl. No.: 554,131

[22] Filed: Nov. 6, 1995

[51] Int. Cl.$^6$ .................................................. H04B 7/185
[52] U.S. Cl. .......................................... 342/352; 455/13.4
[58] Field of Search ................................... 342/352, 353; 455/13.4, 52.2

[56] References Cited

U.S. PATENT DOCUMENTS

| | | | |
|---|---|---|---|
| 4,567,485 | 1/1986 | Oshima et al. | 342/358 |
| 4,697,187 | 9/1987 | Ohno et al. | 342/358 |
| 4,731,866 | 3/1988 | Muratani et al. | 455/9 |
| 4,910,792 | 3/1990 | Takahata et al. | 455/10 |
| 4,941,199 | 7/1990 | Saam | 455/10 |
| 5,060,292 | 10/1991 | Ayukawa et al. | 455/52 |
| 5,625,624 | 4/1997 | Rosen et al. | 370/307 |

OTHER PUBLICATIONS

"Prediction of Attenuation by Rain", By Robert K. Crane, IEEE Transactions on Communications, vol. COM-28, No. 9, Sep. 1980.

*Primary Examiner*—Theodore M. Blum
*Attorney, Agent, or Firm*—W. H. Meise; G. H. Krauss; S. A. Young

[57] ABSTRACT

A control system for the uplink transmitter of a ground station communicating with a spacecraft includes an antenna located at the ground station, pointed toward the spacecraft for receiving downlink signals transmitted therefrom. The received signals are accompanied by noise attributable to ambient, sky and ground temperatures. A low-noise receiver is coupled to the output port of the antenna, for establishing the receiver noise temperature. A processor is coupled to the low-noise receiver apparatus and to the power control input port of the uplink transmitter, for responding to changes in the received noise power attributable to the presence or absence of precipitation in the downlink. The processor does this by producing an estimate of the attenuation attributable to the rain in the downlink, and generates the control signal in response to the estimate of the attenuation. The control signal increases the signal power of the uplink transmitter in response to increases in the estimate of the rain attenuation, and decreases the signal power of the uplink transmitter in response to decreases in the estimate of the rain attenuation. The processor determines the downlink rain attenuation $L_{a,D}$ by $$L_{a,D} \triangleq f(\Delta N_R) = T_{\mathit{eff}}/(1+T_{\mathit{eff}} \cdot \Delta N_R)$$

where $$T_{\mathit{eff}} = (T_{amb} - T_{sky})/(T_{LNA} + T_g + T_{sky})$$

1 Claim, 3 Drawing Sheets

SPACECRAFT COMMUNICATION CHANNEL POWER CONTROL SYSTEM

FIELD OF THE INVENTION

This invention relates to transmit power control systems for spacecraft communications channels, and more particularly to such systems in which uplink transmit power is adjusted to compensate for rain attenuation in a spacecraft downlink.

BACKGROUND OF THE INVENTION

Communications systems now commonly use spacecraft as repeaters. In such a system, a spacecraft, often in a geosynchronous orbit, communicates simultaneously with a plurality of ground stations. Each ground station can transmit to the spacecraft on an uplink, whereupon the spacecraft repeats the transmission on a downlink, beaming it back toward Earth, with coverage extending to all the ground stations which are to be covered. In this manner, each ground station can communicate with other ground stations by way of the communications spacecraft, even though the stations themselves may not be able to communicate directly, either because of lack of a line-of-sight therebetween or for other reasons. It should be noted that the uplink frequencies are often different from the downlink frequencies to aid in reducing interference between the two links.

The quality of communication links to and from spacecraft is dependent upon a number of factors including antenna gain at each end of the link, transmitted power, receiver noise temperature, polarization, and the number of channels or independent signals being handled by a each transmitter. In addition, atmospheric attenuation may be considerable at certain frequencies at which the molecules which constitute the atmosphere absorb radiation. One condition which affects the quality of the communication links, and which can vary from time to time, is the attenuation due to rainfall. The attenuation of the downlink signal due to rainfall can be compensated for by increasing the signal power which is transmitted by the downlink transmitter on the spacecraft, assuming there is additional transmit power available at the spacecraft. If the spacecraft has a beacon, the downlink attenuation due to rainfall can be determined directly by continuously measuring the received beacon signal power, and attributing to rainfall attenuation any decrease in received power. An open-loop control signal can be sent to the spacecraft to command a suitable increase in the downlink transmitted power. If a beacon is not available, a closed-loop feedback loop can be established as an alternative, in which a signal representing the received signal power is transmitted to the spacecraft, and an error signal is generated which controls the downlink transmitter power. This system, however, is subject to errors due to attenuation in the uplink. Also, any of these systems may be fooled into thinking that the received power has changed when an additional channel is added or deleted from the group being communicated, since spacecraft transmit power is divided among the channels.

Improved spacecraft communication system power control systems are desired.

SUMMARY OF THE INVENTION

A control system for the uplink transmitter of a ground station communicating with a spacecraft includes an antenna located at the ground station. The antenna includes an output port, and is pointed or directed toward the spacecraft for receiving downlink signals transmitted therefrom, and for coupling the signals to the output port of the antenna in the form of received signals. The received signals are accompanied by noise attributable to ambient, sky and ground temperatures. A low-noise receiving apparatus is coupled to the output port of the antenna, for receiving the signals therefrom, and for establishing a receiver noise temperature. An uplink transmitter produces signal power which is transmitted to the spacecraft, and includes a power control input port, for controlling the signal power in response to a control signal applied to the power control input port. A processor is coupled to the low-noise receiving apparatus and to the power control input port of the uplink transmitter, for responding to changes in the received noise power attributable to the presence or absence of precipitation in the downlink. The processor does this by producing an estimate of the attenuation attributable to the rain in the downlink, and generates the control signal in response to the estimate of the attenuation. The control signal is preferably generated in a manner which increases the signal power of the uplink transmitter in response to increases in the estimate of the rain attenuation, and decreases the signal power of the uplink transmitter in response to decreases in the estimate of the rain attenuation. A processor according to the invention includes a first arrangement for establishing an effective noise temperature by taking the quotient of a first numerator and a first denominator, wherein the first numerator is the difference between the ambient noise temperature and the sky noise temperature, and the first denominator is the sum of the receiver, ground, and sky noise temperatures. The processor further includes a second arrangement for taking the quotient of a second numerator and a second denominator, wherein the second numerator is the effective noise temperature, and the second denominator is the sum of the effective noise temperature and the number one, from which is subtracted the measured change in receiver noise.

DESCRIPTION OF THE INVENTION

Figure 1:
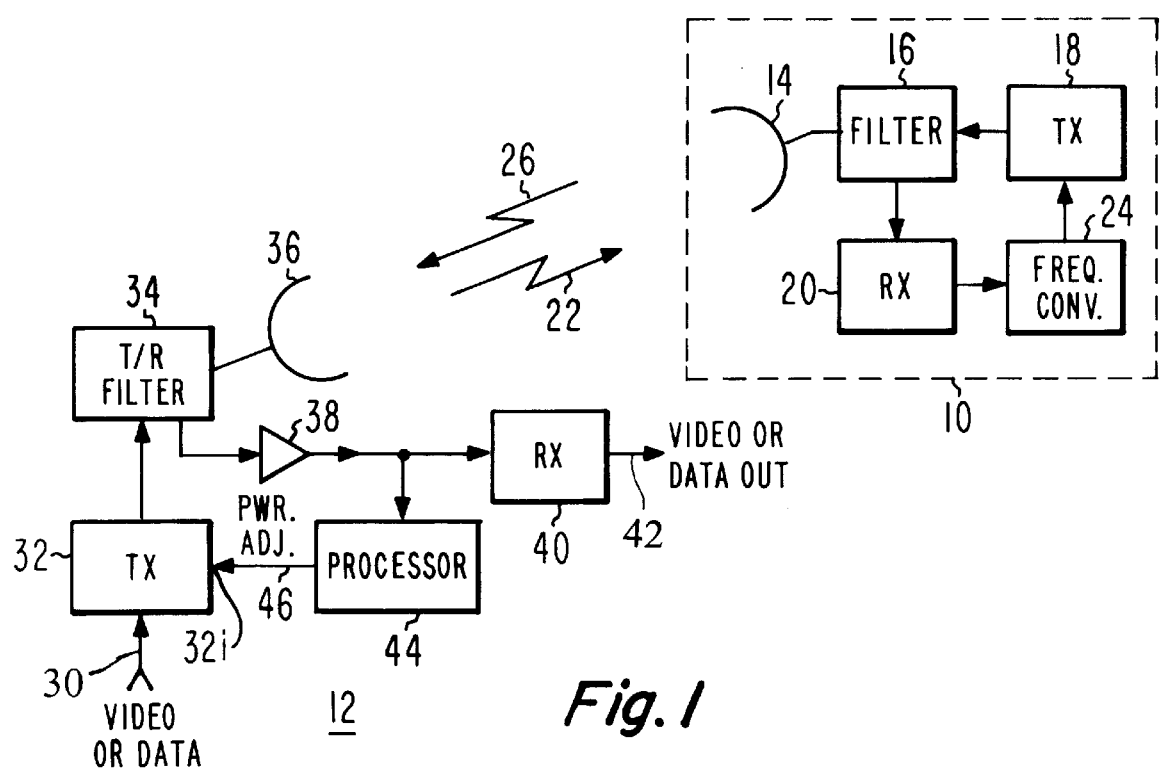
FIG. 1 is a simplified block diagram of a spacecraft communication system according to the invention.

In FIG. 1, a spacecraft 10 communicates with a ground station designated generally as 12, and with other ground stations (not illustrated). Spacecraft 10 includes an antenna 14 which is coupled to a transmit-receive apparatus such as a frequency-sensitive filter 16 in the context of different uplink and downlink frequencies. Filter 16 is connected to a transmitter (TX) 18 and to a receiver (RX) 20. Uplink signals received over an uplink path 22 from ground station 12 are coupled from antenna 14, through filter 16 to receiver 20. The received signals from receiver 20 are processed, as by frequency conversion in a block 24, before being applied to transmitter 18. Transmitter 18 applies the signals through filter 16 to antenna 14 for transmission over a downlink path 26 to ground station 12.

Ground station 12 of FIG. 1 includes a video or data input port 30, to which information to be transmitted to other ground stations may be applied. Signals applied to port 30 are coupled to a transmitter (TX) 32, which modulates the data onto one or more carriers. The transmitter power is adjusted or controlled by a control signal applied to an input port 32i. The carrier(s) produced by transmitter block 32 are applied through a transmit-receive device 34, which in this case is a filter similar in function to that of filter 16, to an antenna 36. The transmit signals from ground station 12 travel along uplink path 22 to spacecraft 10, where they are handled as described above.

When ground station 12 of FIG. 1 receives data-modulated signals from spacecraft 10, the data will include that which originated from ground stations other than ground station 12. The signals received by antenna 36 from downlink 26 are coupled through filter 34 to a receiver including a low-noise amplifier 38 and a receiver (RX) block 40. Receiver block 40 may include downconverters for converting to an intermediate frequency (IF), IF amplifiers, demodulators, and the like, all of which are well known in the art, for extracting the data or video content, and for making it available at an output port 42.

The output of low-noise amplifier 38 of FIG. 1 is coupled to a processor 44, which determines downlink attenuation attributable to rain, and which generates a control signal which is applied over a signal path 46 to input port 32i of transmitter 32. When increased rain attenuation is detected in the downlink 26, the power transmitted over the uplink 22 is increased, preferably in proportion to the amount of downlink attenuation.

Figure 2:
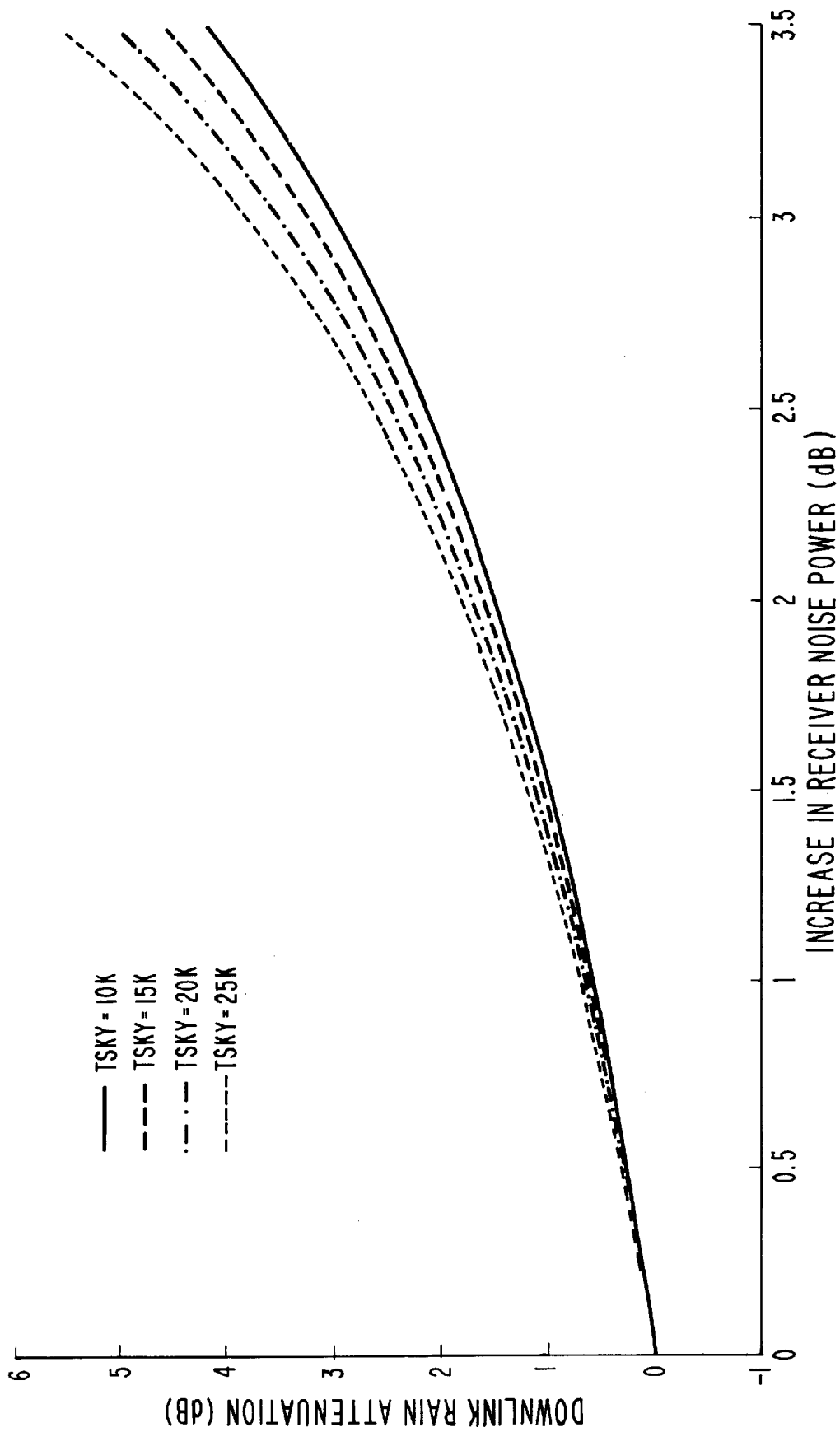
FIG. 2 plots the relationship of downlink rain attenuation and receiver noise power.

The invention is based upon the observation that the receiver noise power increases with rain attenuation, as illustrated in FIG. 2. More specifically, the noise power is given by Equation (1)

$$N_R = k(T_{LNA} + T_g + (T_{sky}/L_{a,D}) + T_{amb}(L_{a,D}-1)/L_{a,D})B$$

where:

k is Boltzmann's constant, $1.379 \times 10^{-23}$ W/Hz.K.°;

$T_{LNA}$ is the noise temperature of the low-noise amplifier of the receiver;

$T_g$ is the noise temperature of the ground;

$T_{sky}$ is the noise temperature of the sky;

$L_{a,D}$ is the dimensionless downlink rain attenuation;

$T_{amb}$ is the ambient noise temperature; and

B is the receiver bandwidth in Hertz.

The increase $\Delta N_R$ of the receiver noise power can be determined by Equation 2

$$\Delta N_R \triangleq N_R'/N_R^{cs} = 1 + (L_{a,D}-1)/L_{a,D}[(T_{amb}-T_{sky})/(T_{LNA}+T_g+T_{sky})] \quad (2)$$

where $\triangleq$ means a definition.

The downlink rain attenuation $L_{a,D}$ is defined as $$L_{a,D} \triangleq f(\Delta N_R) = T_{eff}/(1+T_{eff}-\Delta N_R) \quad (3)$$

where $$T_{eff} = (T_{amb}-T_{sky})/(T_{LNA}+T_g+T_{sky}) \quad (4)$$

FIG. 2 includes plots of downlink rain attenuation versus receiver noise power, with sky noise temperature as a parameter. In preparing FIG. 2, $T_{amb}$ was assumed to be 290° K., and $T_{LNA}$ was assumed to be 120° K. Also, $T_g$ was assumed to be 10° K., which is a good approximation for elevation angles between 10° and 90°. In FIG. 2, the lowermost or solid-line plot represents a sky noise temperature of 10° K., the uppermost or dotted-line plot represents a sky noise temperature of 25° K., while the two intermediate dash-line plots represent 15° and 20°. As will be apparent from the plots of FIG. 2, there is a significant change in receiver noise temperature as a function of downlink rain attenuation, which is greater or more sensitive when the sky noise temperature is lower.

Figure 3:
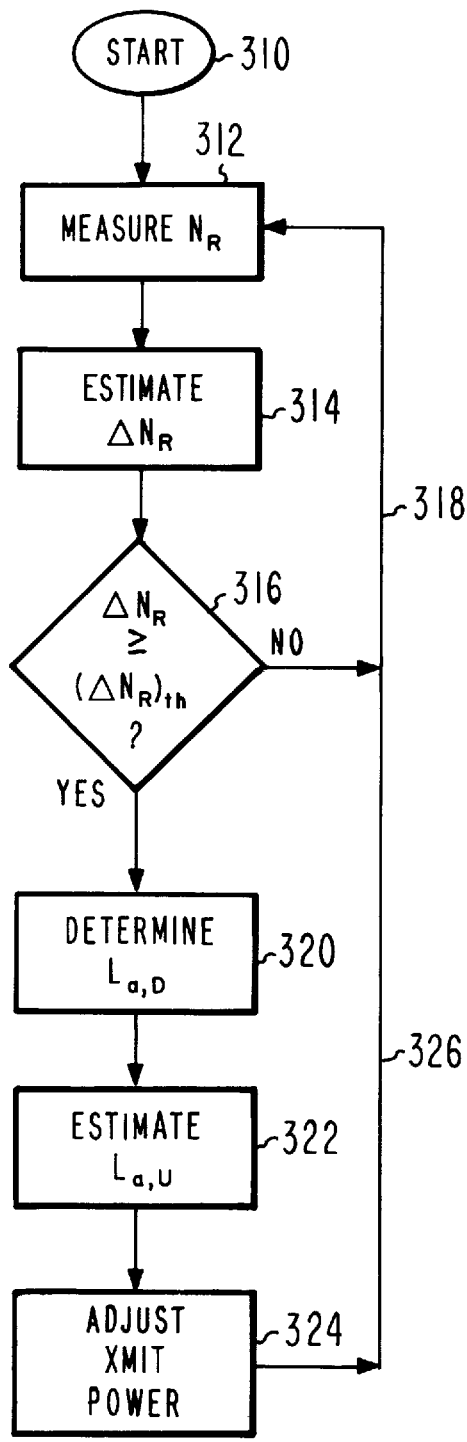
FIG. 3 is a simplified flow chart illustrating processing according to the invention.

FIG. 3 is a simplified flow chart, representing logic which implements the calculations required for determining receiver noise, and for generating the desired control signal for control of the uplink transmitter. In FIG. 3, the logic begins at a START block 310, and flows to a block 312, which represents the measurement of receiver noise $N_R$. The measurement of receiver noise is accomplished by means of an RF power meter coupled to the output of the low-noise amplifier 38 of FIG. 1, and compensating for the gain and noise figure or noise temperature of the amplifier. The value of $N_R$ is stored in temporary memory. From block 312, the logic flows to a block 314, which represents comparison of the current value of $N_R$ with a previously stored value measured under clear-sky conditions, and subtracting the two values to generate $\Delta N_R$. From block 314, the logic flows to a decision block 316, in which the magnitude of $\Delta N_R$ is compared with a threshold designated $(\Delta N_R)_{th}$. The value of the threshold represents mitigation or ignoring of inaccuracies of the receiver noise measurement. If the value of $\Delta N_R$ is less than the threshold value $(\Delta N_R)_{th}$, the assumption is made that clear-sky conditions prevail, and the logic leaves decision block 316 by the NO output, and returns by a logic path 318 to block 312. The logic continues to flow around the loop including blocks 312, 314, 316, and path 318, until such time as $\Delta N_R$ is greater than or equal to the threshold value $(\Delta N_R)_{th}$, in which case the logic leaves decision block 316 by the YES output and arrives at a further block 320. Block 320 computes estimated downlink rain attenuation $L_{a,D}$ from the measured receiver noise power by use of equations (3) and (4), using stored values of known constants $T_{LNA}$ (noise temperature of the low-noise amplifier), $T_g$ (noise temperature of the ground), and $T_{sky}$ (noise temperature of clear sky).

From block 320, the logic of FIG. 3 flows to a block 322, which represents the formation of an estimate of uplink rain attenuation $L_{a,U}$ from the downlink rain attenuation $L_{a,D}$. This is performed by a transformation, such as by addressing a memory with reading addresses which correspond to the downlink rain attenuation. The memory is preprogrammed with the corresponding uplink attenuation, derived from known charts, or by the use of an appropriate model, such as Crane's rain model, or from empirical data. From block 322, the logic flows to a block 324, which represents generation and application to the uplink transmitter of a control signal which is appropriate for making a power change of the value $L_{a,U}$. From block 324, the logic returns by paths 326 and 318 to block 312, to iteratively repeat its traverse of the logic. Such a system automatically and quasi-continuously (at the iteration rate) adjusts the uplink transmitted power based upon the estimated downlink rain attenuation.

Other embodiments of the invention will be apparent to those skilled in the art. For example, frequency reuse of the available spectrum may be accomplished by polarization separation, as known in the art. Instead of a low-noise amplifier, the receiver may include a low-noise frequency converter in conjunction with a low-noise following amplifier. The antennas at the spacecraft, the ground station, or both, may be array or reflector types. While the invention has been described as being applicable to spacecraft which have no beacons, the invention may be used with spacecraft which have beacons. While the signal for the processor 44 of FIG. 1 has been illustrated as being taken from the output of the low-noise amplifier, it may be taken from any location at which the relevant signals are available at the appropriate levels.

What is claimed is:

1. A control system for an uplink transmitter of a ground station communicating with a spacecraft, said control system comprising:

an antenna means located at said ground station, said antenna means including at least an output port, and being directed toward said spacecraft for receiving downlink signals transmitted therefrom, and for coupling said signals to said output port of said antenna means in the form of received signals, said received signals being accompanied by noise power attributable to ambient, sky and ground temperatures;

a low-noise receiving apparatus coupled to said output port of said antenna means, for receiving said signals from said output port of said antenna means, and for establishing a receiver noise temperature;

an uplink transmitter producing signal power which is transmitted to said spacecraft, said uplink transmitter also including a power control input port, for controlling said signal power in response to a control signal applied to said power control input port;

processing means coupled to said low-noise receiving apparatus and to said power control input port of said uplink transmitter, for responding to changes in said noise power attributable to the presence or absence of precipitation in said downlink by producing an estimate of the attenuation attributable to said precipitation in said downlink, and generating said control signal in response to said estimate of the attenuation; and wherein said processing means includes:

means for establishing an effective noise temperature by taking the quotient of a first numerator and a first denominator, wherein said first numerator is the difference between ambient noise temperature and said sky noise temperature, and said first denominator is the sum of said receiver, ground, and sky noise temperatures; and further includes means for taking the quotient of a second numerator and a second denominator, wherein said second numerator is said effective noise temperature, and said second denominator is the sum of said effective noise temperature and the number one, from which is subtracted the measured change in receiver noise.

* * * * *